United States Patent
Fehr et al.

(10) Patent No.: US 9,901,945 B2
(45) Date of Patent: Feb. 27, 2018

(54) SPRAY SYSTEM PUMP WASH SEQUENCE

(71) Applicant: Graco Minnesota Inc., Minneapolis, MN (US)

(72) Inventors: David L. Fehr, Champlin, MN (US); Dennis J. Van Keulen, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/904,655

(22) PCT Filed: Jul. 18, 2014

(86) PCT No.: PCT/US2014/047198
§ 371 (c)(1),
(2) Date: Jan. 12, 2016

(87) PCT Pub. No.: WO2015/010021
PCT Pub. Date: Jan. 22, 2015

(65) Prior Publication Data
US 2016/0167076 A1   Jun. 16, 2016

Related U.S. Application Data

(60) Provisional application No. 61/856,104, filed on Jul. 19, 2013.

(51) Int. Cl.
*F04B 53/00* (2006.01)
*B05B 7/12* (2006.01)
(Continued)

(52) U.S. Cl.
CPC ............. *B05B 7/1254* (2013.01); *B05B 7/04* (2013.01); *B05B 7/24* (2013.01); *B05B 9/0406* (2013.01);
(Continued)

(58) Field of Classification Search
CPC ........... B05B 7/04; B05B 7/24; B05B 7/1254; B05B 9/0413; B05B 12/087;
(Continued)

(56) References Cited

U.S. PATENT DOCUMENTS 4,375,865 A * 3/1983 Springer ................. B05B 12/14
                                                    118/302
5,306,350 A     4/1994 Hoy et al.
(Continued)

FOREIGN PATENT DOCUMENTS

CN       101175576 A    5/2008
JP       H0810684 A     1/1996
(Continued)

OTHER PUBLICATIONS

International Search Report and Written Opinion from PCT Application Serial No. PCT/US2014/047198, dated Nov. 11, 2014, 11 pages.
(Continued)

*Primary Examiner* — Viet Le
(74) *Attorney, Agent, or Firm* — Kinney & Lange, P.A.

(57) ABSTRACT

A method for a system having a plurality of primary fluid sources and a fluid output with a common pump includes halting pumping of a first fluid, isolating the common pump from the fluid output and the primary fluid sources, connecting an inlet of the common pump to a solvent source and an outlet of the common pump to a waste fluid dump, actuating the common pump first in a pumping mode, then in a recirculation mode, and then in a flush mode, connecting an inlet of the common pump to a second primary fluid source, and an outlet of the common pump to the output line, and starting pumping mode pumping of a second fluid from the second primary fluid source through the output line.

12 Claims, 4 Drawing Sheets

(51) Int. Cl.
| | | |
|---|---|---|
| *B05B 7/04* | (2006.01) | |
| *B05B 7/24* | (2006.01) | |
| *B05B 12/08* | (2006.01) | |
| *B05B 12/14* | (2006.01) | |
| *B05B 15/02* | (2006.01) | |
| *F04B 5/02* | (2006.01) | |
| *F04B 7/02* | (2006.01) | |
| *F04B 13/00* | (2006.01) | |
| *F04B 15/02* | (2006.01) | |
| *F04B 17/03* | (2006.01) | |
| *F04B 19/22* | (2006.01) | |
| *F04B 23/06* | (2006.01) | |
| *F04B 39/02* | (2006.01) | |
| *F04B 39/10* | (2006.01) | |
| *F04B 49/10* | (2006.01) | |
| *F04B 49/22* | (2006.01) | |
| *F04B 51/00* | (2006.01) | |
| *F04B 53/10* | (2006.01) | |
| *F04B 53/14* | (2006.01) | |
| *F04B 53/16* | (2006.01) | |
| *F16N 7/32* | (2006.01) | |
| *B05B 9/04* | (2006.01) | |

(52) U.S. Cl.
CPC .......... *B05B 9/0413* (2013.01); *B05B 12/087* (2013.01); *B05B 12/149* (2013.01); *B05B 12/1418* (2013.01); *B05B 15/025* (2013.01); *F04B 5/02* (2013.01); *F04B 7/02* (2013.01); *F04B 13/00* (2013.01); *F04B 15/02* (2013.01); *F04B 17/03* (2013.01); *F04B 19/22* (2013.01); *F04B 23/06* (2013.01); *F04B 39/0292* (2013.01); *F04B 39/10* (2013.01); *F04B 49/10* (2013.01); *F04B 49/22* (2013.01); *F04B 51/00* (2013.01); *F04B 53/10* (2013.01); *F04B 53/14* (2013.01); *F04B 53/16* (2013.01); *F16N 7/32* (2013.01); *B05B 7/0408* (2013.01); *B05B 7/2486* (2013.01); *B05B 7/2497* (2013.01); *B05B 9/04* (2013.01); *F04B 2201/0601* (2013.01)

(58) Field of Classification Search
CPC . B05B 12/1418; B05B 12/149; B05B 15/025; F04B 13/00; F04B 15/02; F04B 17/03; F04B 19/22; F04B 23/06; F04B 39/10; F04B 49/10; F04B 49/22; F04B 51/00; F04B 53/10; F04B 53/14; F04B 53/16
USPC ................. 239/104, 106, 110, 112, 113, 120
See application file for complete search history.

(56) References Cited

U.S. PATENT DOCUMENTS

| | | | |
|---|---|---|---|
| 5,330,101 | A | 7/1994 | Turner et al. |
| 5,389,149 | A | 2/1995 | Carey et al. |
| 5,571,562 | A * | 11/1996 | Wakat ............... B05B 7/066 |
| | | | 118/315 |
| 6,423,152 | B1 | 7/2002 | Landaas |
| 6,840,404 | B1 * | 1/2005 | Schultz ............ B01F 15/0466 |
| | | | 222/137 |
| 2007/0095938 | A1 * | 5/2007 | Rioux ................ B01F 7/00133 |
| | | | 239/302 |
| 2008/0210262 | A1 | 9/2008 | Lauzon |
| 2009/0202731 | A1 | 8/2009 | Kazkaz et al. |

FOREIGN PATENT DOCUMENTS

| | | |
|---|---|---|
| JP | H1176906 A | 3/1999 |
| JP | 2004209379 A | 7/2004 |
| JP | 2007167809 A | 7/2007 |

OTHER PUBLICATIONS

Extended European Search Report for EP Application No. 14825826.2, dated Mar. 16, 2017, 9 pages.
Office Action from TW Application No. 103120513, dated Oct. 25, 2017, 16 pages.

* cited by examiner

SPRAY SYSTEM PUMP WASH SEQUENCE

BACKGROUND

The present invention relates generally to applicator systems that are used to spray fluids, such as paint, sealants, coatings, and the like. More particularly, the invention relates to a wash sequence for transitioning between spray fluids using a single common pump.

Fluid spray systems are used in a wide range of applications, including painting, glue application, and foam spraying. Some fluid applicators have separate "A-side" and "B-side" fluid systems (e.g. pumps, reservoirs, and fluid lines) that carry different fluids components, while others pump and spray only a single spray material. Common materials pumped in spray systems include paints, polyurethanes, isocyanates, polyesters, epoxies, and acrylics.

In some applications, it may be necessary or desirable to spray a variety of different materials (e.g. several different paints) with one spraying system. In such cases, the spraying system must ordinarily be thoroughly washed to avoid cross-contamination of different spray fluids, and reconnected to a new fluid source.

SUMMARY

A method for a system having a plurality of primary fluid sources and a fluid output with a common pump includes halting pumping of a first fluid, isolating the common pump from the fluid output and the primary fluid sources, connecting an inlet of the common pump to a solvent source and an outlet of the common pump to a waste fluid dump, actuating the common pump first in a pumping mode, then in a recirculation mode, and then in a flush mode, connecting an inlet of the common pump to a second primary fluid source, and an outlet of the common pump to the output line, and starting pumping of a second fluid from the second primary fluid source through the output line.

A spray system includes a solvent source, a waste fluid dump, a pump, a controller, valved inlet and outlet manifolds, and first and second fluid sources and sprayers for a first and second spray fluids, respectively. The solvent source supplies a washing solvent. The pump includes a metered double-action pumping cylinder with a reciprocating plunger, and first and second inlet and outlet valves. The valved inlet manifold selectively couples the pump to the first and second fluid sources and the solvent source, while the valved outlet manifold selectively couples the pump to a fluid output and the waste fluid dump. The controller is configured to control the pump to spray the first fluid during a first operational state and the second fluid in a second operational state, and to transition from the first operational state to the second operational state via an intermediate washing process. In the intermediate washing process, the valved inlet manifold connects the pump to the solvent source, the valved outlet manifold connects the pump to the waste fluid dump, and the pump is actuated first in a pumping mode to flush the first fluid from the pump, then in a recirculation mode to circulate washing solvent through the pump.

DETAILED DESCRIPTION

The present invention is a system and method for washing a common spray pump shared by multiple spray fluids, as a means of transitioning from spraying one fluid to another.

Figure 1:
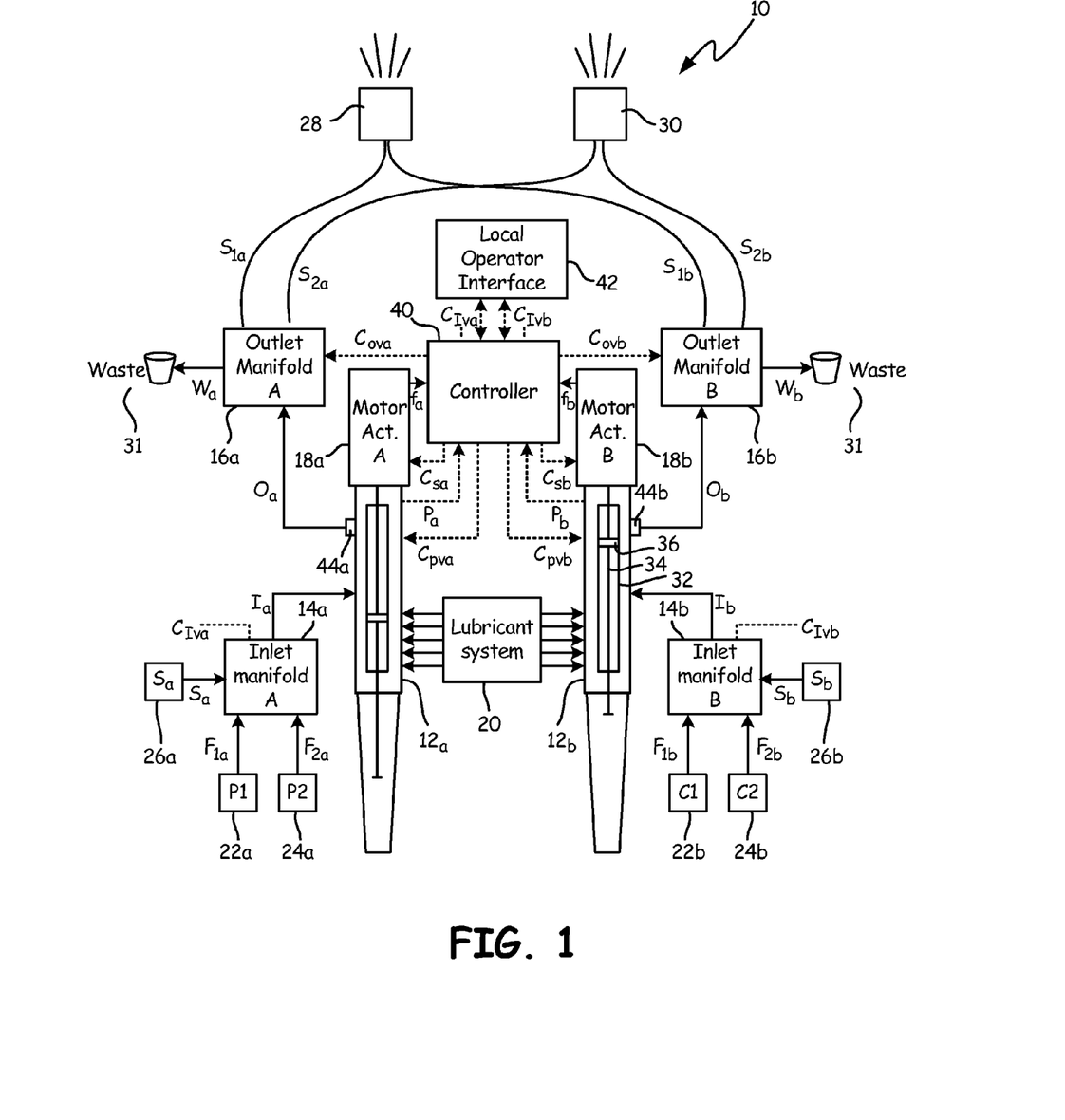
FIG. 1 is a schematic view of a spray system

FIG. 1 is a schematic diagram of spray system 10, a two-side spray system with an A-side and a B-side configured to carry separate fluid components that are only combined when sprayed. Spray system 10 can, for example, combine an A-side paint with a B-side catalyst (e.g. a polyurethane, acrylic, polyester, or epoxy) at the moment of spraying. Although spray system 10 will be discussed hereinafter primarily as a system for spraying paint, the present invention can analogously be applied to sprayers for foam, adhesive, and other materials. Many components of spray system 10 are present in parallel on both A- and B-sides of the system. For clarity, A-side components are labeled with an "a" subscript, while B-side components are labeled with a "b" subscript. Hereinafter, reference numbers without subscript will be used to refer generically to elements found in parallel on both A- and B-sides of spray system 10, and to single elements common to both sides, while particular A- or B-side counterparts will be denoted with "a" or "b" subscripts, as appropriate. "Pump 12a" and "pump 12b," for example, are specific elements of the A- and B-side subsystems of spray system, respectively. Description related to "pump 12" (without subscript) refers generically to pump.

Spray system 10 includes A- and B-side pumps 12 that pump fluid from inlet manifolds 14 via inlet lines $I_a$ and $I_b$ to outlet manifolds 16 via outlet lines $O_a$ and $O_b$. In the depicted embodiment, pumps 12 are double-action reciprocating cylinder pumps driven by motorized actuators 18, with seals lubricated by lubricant system 20. Motorized actuators 18 can, for example, be linear DC step motors. Lubricant system 20 includes at least one lubricant reservoir and fluid routing lines suited to carry lubricant from lubricant system 20 to valve seals and other throat seals of pumps 12. Although lubricant system 20 is illustrated as a unitary system, some embodiments of spray system 10 can use separate A- and B-side lubricant systems, e.g with different lubricants.

Inlet and outlet manifolds 14 and 16, respectively, are valved manifolds that selectively couple pumps 12 to a plurality of fluid sources and outputs. Inlet and outlet manifolds 14 and 16 allow spray system 10 to switch between a plurality of connected fluids without any need to disconnect or reconnect fluid lines. Although each outlet manifold 16 is depicted with three outlets and each inlet manifold 14 is depicted with three inlets, any number of inlets and outlets can be used. Under ordinary operating conditions, valving in manifolds 14 and 16 allows only one input or output line to be open at a time. In some embodiments, inlet and outlet manifolds 14 and 16 are controlled electronically, as discussed in greater detail below with respect to controller 40. In other embodiments, inlet and outlet manifolds 14 and 16 can be actuated manually. Some embodiments of spray system 10 can allow for both electronic and manual valve actuation of inlet and outlet manifolds 14 and 16.

In the depicted embodiment, inlet manifolds 14 selectively connect pumps 12 to primary fluid sources 22 and 24 via fluid lines $F_1$ and $F_2$, respectively, and to solvent sources 26 via solvent lines S. Primary fluid sources 22a and 24a can, for example, be first and second paints P1 and P2, while primary fluid sources 22b and 24b can, for example, be first and second catalyst fluids C1 and C2. Solvent sources 26a and 26b can draw upon a common reservoir of solvent material, or can use different solvent materials.

In the depicted embodiment, outlet manifolds 16 similarly selectively connect pumps 12 to sprayers 28 and 30 via spray lines $S_1$ and $S_2$, and to waste fluid dump 31 via waste lines W. Waste fluid dump 31 accepts waste paint, catalyst, and solvent flushed from spray system 10 (e.g. when switching from first paint P1 and first catalyst fluid C1 to second paint P2 and second catalyst fluid C2). Sprayers 28 and 30 each accept spray lines from both A-side and B-side outlet manifolds 16. Sprayer 28, for example, accepts spray line $S_{1a}$ from A-side outlet manifold 16a and spray line $S_{1b}$ from B-side outlet manifold 16b. Although only two sprayers 28 and 30 are depicted in FIG. 1, any number of separate sprayers can be used. Each sprayer can be dedicated to a single spray fluid combination (e.g. of paint and catalyst), to avoid mixture or fouling of different fluids. Accordingly, embodiments with additional fluid sources advantageously include additional sprayers, as well. Alternatively, sprayers need not be devoted to particular fluid combinations, but can be used sequentially for multiple different fluid combinations, if washed between spray sessions with different fluids. Sprayers 28 and 30 can, for example, be user-triggered spray guns or machine-actuated automatic sprayers.

In some embodiments, primary fluid sources 22 and 24 and solvent sources 26 are pre-pressurized sources capable of supplying at least 50% of output pressure of pumps 12. Pre-pressurized sources alleviate pumping load on motorized actuators 18, such that pumps 12 need only supply less than 50% (per the previously stated case) of output pressure. Sources 22, 24, and 26 can include dedicated pumps for pre-pressurizing fluids.

In the depicted embodiment, pumps 12 are metered linear pumps with dosing cylinders 32 that carry displacement rods 34. Displacement rods 34 are driven by motorized actuators 18, and both situate and drive plungers 36. In some embodiments, dosing cylinders 32, displacements rods 34, and plungers 36 may be balanced in working surface area so as to receive equal pressure from pre-pressurized sources (e.g. 22, 24) on up- and down-strokes.

The motor speed of motorized actuators 18 is variable, and determines the displacement of pumps 12. Displacement rods 34 extend into rod reservoirs 38, which can in some embodiments be flooded with lubricant from lubricant system 20. Pumps 12 each have inlet and outlet valves that actuate between up- and down-strokes of displacement rods 34 to direct fluid above or below plungers 36.

Spray system 10 is controlled by controller 40. Controller 40 is a computing device such as a microprocessor or collection of microprocessors with associated memory and local operator interface 42. Local operator interface 42 is a user interface device with, e.g. a screen, keys, dials, and/or gauges. In some embodiments of the present invention, local operator interface 42 can be a wired or wireless connection for a user operated tablet or computer. In other embodiments, local operator interface 42 can be an integrated interface configured to accept direct user input and provide diagnostic and operational data directly to a user. Local operator interface 42 can, for example, enable a user to input target ratios of A- and B-side fluid flow for each combination of A- and B-side fluids, and target output pressure. Local operator interface 42 can also provide users with diagnostic information including but not limited to failure identifications (e.g. for clogging or leakage), spray statistics (e.g. fluid volume sprayed or remaining), and status indications (e.g. "cleaning," "spraying," or "offline"). In some embodiments, controller 40 may include a database of known or previous configurations (e.g. target ratios and/or pressures for particular materials), such that a user at local operator interface 42 need only select a configuration from several options.

Controller 40 controls motorized actuators 18 via motor speed control signals $c_s$ and controls pump valving of pumps 12 via pump valve control signals $c_{PV}$. Controller 40 synchronizes valve actuation of pumps 12 with pump change-over to minimize downtime as plungers 36 reaches the top or bottom of their travel distances within dosing cylinder 32. In some embodiments, controller 40 may also control valving of inlet manifolds 14 and outlet manifolds 16 via inlet valve control signals $c_{IV}$ and outlet valve control signals $c_{OV}$, respectively. Controller 40 receives sensed pressure values $P_a$ and $P_b$ from pressure sensors 44a and 44b, respectively, and receives encoder feedback data $f_a$ and $f_b$ reflecting motor states from motorized actuators 18a and 18b, respectively.

Pumping system 10 provides substantially uniform and continuous spray pressure through pump changeovers at specified pressures and material ratios. Pumping system 10 enables clean and efficient pumping and fluid switching without risk of fluid contamination, and without need for lengthy downtimes or large volume use of washing solvents.

Figure 2A:
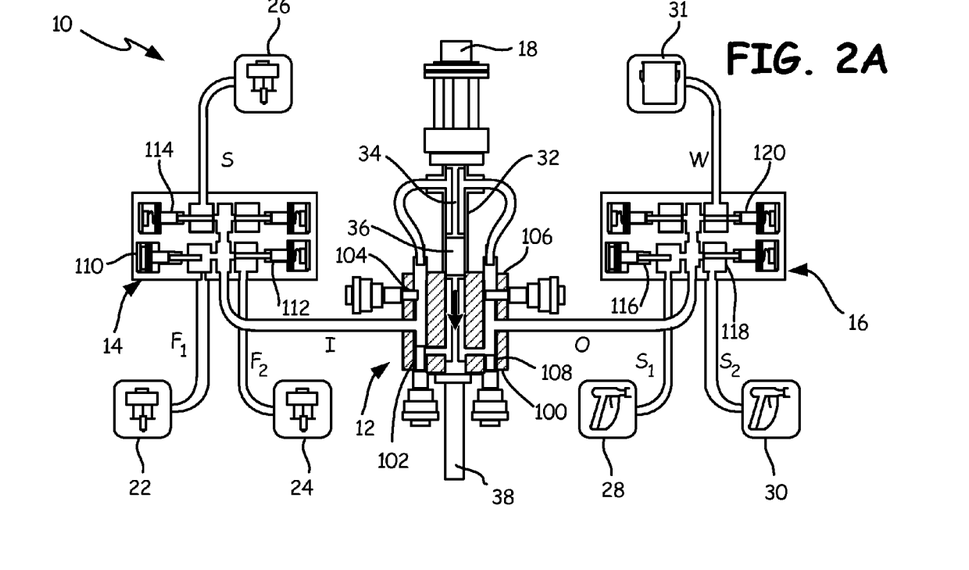
FIGS. 2a and 2b are schematic views of operating states of a pump of the spray system of FIG. 1.
Figure 2B:
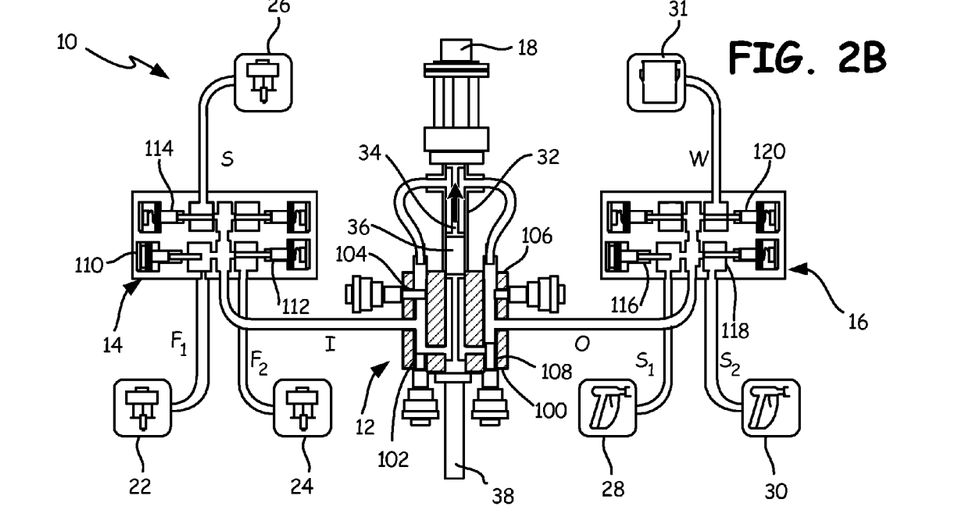

FIGS. 2a and 2b are schematic views of spray system 10 focusing on pump 12 (i.e. 12a or 12b, equivalently). FIGS. 2a and 2b illustrate operating states of pump 12, with FIG. 2a depicting pump 12 in a down-stroke valve state and FIG. 2b depicting pump 12 in an up-stroke valve state. FIGS. 2a and 2b depict inlet manifold 14, outlet manifold 16, motorized actuator 18, primary fluid sources 22 and 24, solvent source 26, sprayers 28 and 30, waste fluid dump 31, dosing cylinder 32, displacement rod 34, plunger 36, and various connecting fluid lines as described previously with respect to FIG. 1. FIGS. 2a and 2b further depict body 100 of pump 12, "up" and "down" inlet valves 102 and 104, respectively, "up" and "down" outlet valves 106 and 108, respectively, inlet manifold valves 110, 112, and 114, and outlet manifold valves 116, 118, and 120.

FIGS. 2a and 2b depict a state of spray system 10 in which inlet manifold 14 has engaged primary fluid source 22 and outlet manifold 16 has engaged sprayer 28. Accordingly, inlet manifold valve 110 to fluid line $F_1$ is open, and inlet manifold valves 112 and 114 to fluid line $F_2$ and solvent line S, respectively, are closed. Similarly, outlet manifold valve 116 to sprayer 28 is open, while outlet manifold valves 118 and 120 to sprayer 30 and waste fluid dump 31, respectively, are closed. Valves 110, 112, 114, 116, 118, and 120 are depicted as pin valves, but any pressure-capable valves may equivalently be used. As noted with respect to FIG. 1, these valves may be actuated by controller 40, or directly by a user. Only one inlet manifold valve (110, 112, 114) and one outlet manifold valve (116, 118, 120) will ordinarily be open at any time.

Inlet valves 102 and 104 and outlet valves 106 and 108 of pump 12 are actuated by controller 40 in coordination with up- and down-strokes of displacement rod 34 and plunger 36. "Up" inlet and outlet valves 102 and 106, respectively, are open and "down" inlet and outlet valves 104 and 108, respectively, are closed while displacement rod 34 and plunger 36 travel upward (FIG. 2b). "Up" inlet and outlet valves 102 and 106, respectively, are closed and "down" inlet and outlet valves 104 and 108, respectively, are open while displacement rod 34 and plunger 36 travel downward (FIG. 2a). Controller 40 actuates these valves between pump strokes so as to minimize pump downtime during pump changeover. Lengthy changeover times can otherwise reduce output pressures and introduce undesirable pressure variation. The reciprocation of plunger 36 draws fluid from primary fluid source 22 into pump body 100 from inlet I, and forces fluid from pump body 100 towards sprayer 28 through outlet O. As mentioned above with respect to FIG. 1, pump 12 can be balanced to receive equal pressure assist from pre-pressurized fluid sources (i.e. 22, 24, 26). Balanced embodiments of pump 12 have displacement rods 34 and plungers 36 with equal up-stroke and down-stroke working surface area.

Figure 3:
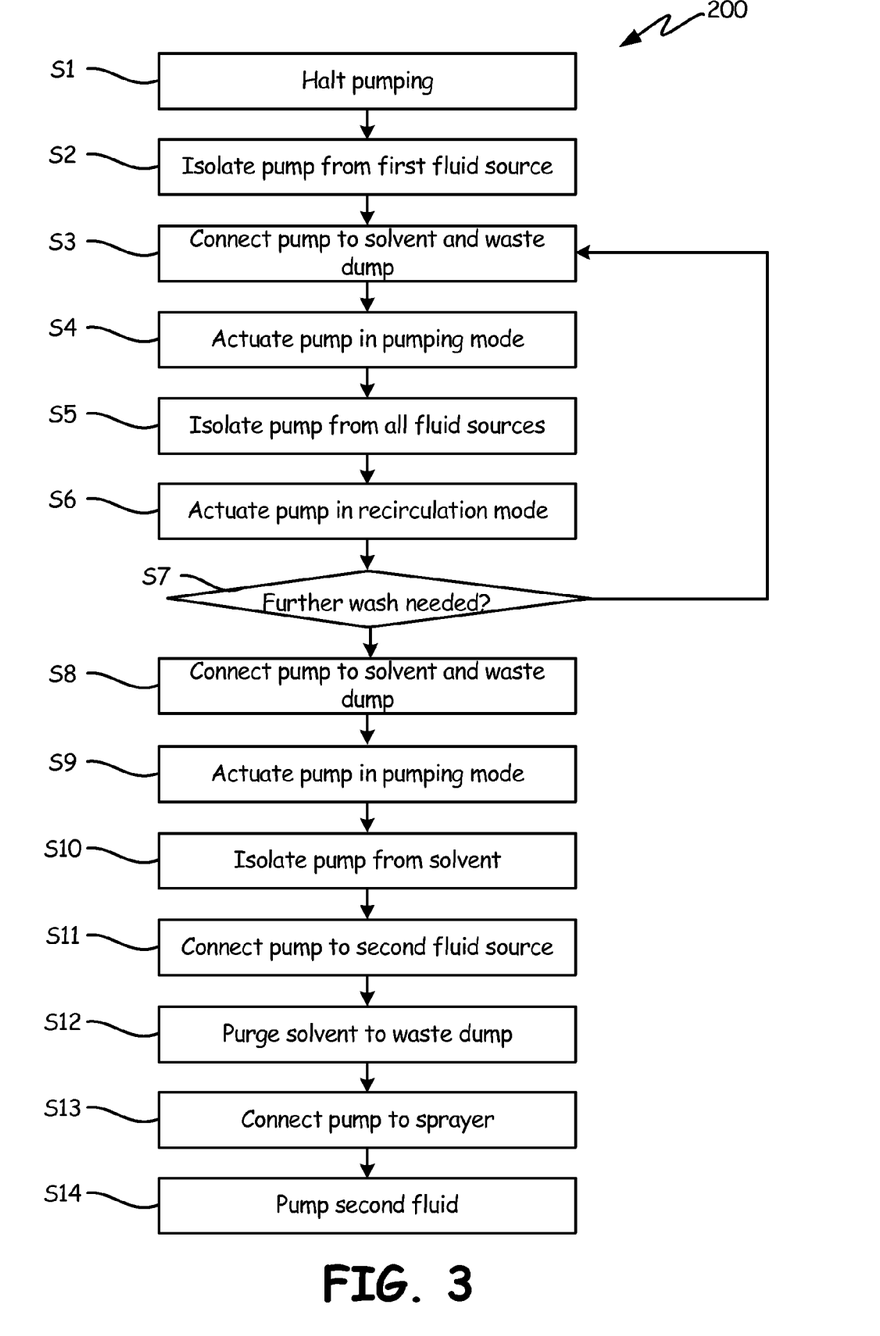
FIG. 3 is a method flowchart illustrating a wash sequence for the pump of FIG. 1.

FIG. 3 is a method flowchart illustrating method 200. Method 200 illustrates a material switching process and washing sequence whereby pump 12 transitions from pumping a first primary fluid to a second (e.g. from fluid source 22 to fluid source 24). As discussed above with respect to FIGS. 1, 2a, and 2b, each fluid source has a dedicated fluid line to inlet manifold 14, and may use either a shared or dedicated sprayer 28 or 30 with spray line $S_1$ or $S_2$. Dedicated fluid lines avoid cross-contamination of pumping fluids between inlet manifold 14 and outlet manifold 16, but inlet line I, pump 12, and outlet line O are shared in common between all materials processed by spray system 10. Embodiments of spray system 10 that utilize the same sprayer for multiple fluid types can wash or sprayers between spray sessions with different materials. Method 200 allows system 10 to avoid contamination of these sections by automatically washing out inlet manifold 14, pump 12, and outlet manifold 16 with solvent material as a part of switching between primary fluids (e.g. between paints or catalysts).

At the start of a pumping material switch, controller 40 commands pump 12 to halt pumping. (Step S1). Controller 40 then transmits control signals $C_{IV}$ and $C_{OV}$ commanding inlet manifold 14 and outlet manifold 16 to isolate pump 12 from primary fluid sources by closing valves 110, 112, 116, and 118. (Step S2). Next, controller 40 commands inlet manifold 14 to open valve 114, and outlet manifold 16 to open valve 120, thereby connecting pump 12 to solvent source 26 and waste fluid dump 31. (Step S3).

Previously loaded primary fluid is flushed from inlet manifold 14, inlet line I, pump 12, outlet line O, and outlet manifold 16 by actuating pump 12 in an ordinary pumping mode (described above with respect to FIGS. 2a and 2b) while fluidly connected to solvent source 26 and waste fluid dump 31. (Step S4). Controller 40 directs pump 12 through a sufficient number of ordinary pumping cycles to force any primary fluid remaining in the fluid out past outlet manifold 16. Waste fluid is expelled into fluid dump 31.

Figure 4:
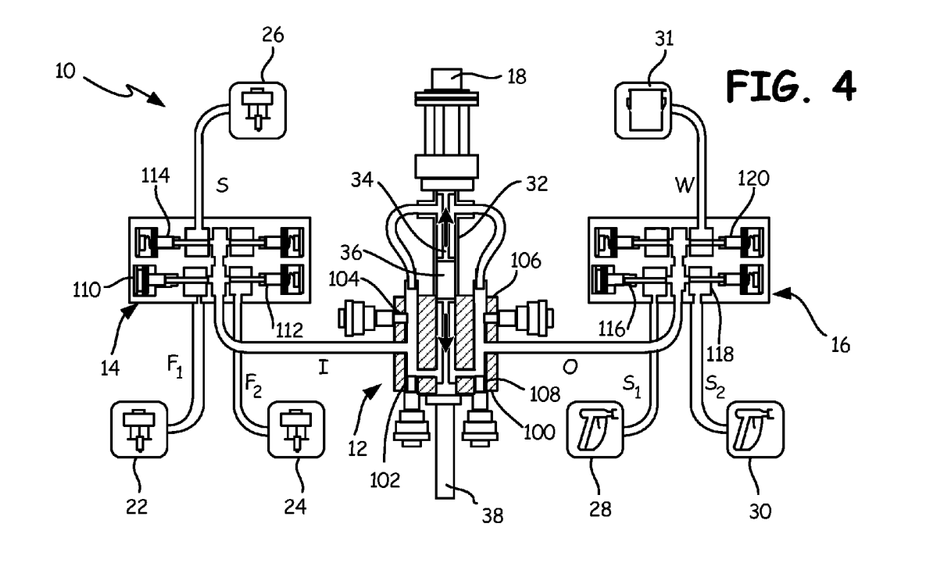
FIG. 4 is a schematic view of a recirculation state of the pump of FIG. 1 during a recirculation mode of the wash sequence of FIG. 3.

Washing is accomplished primarily by recirculating solvent through pump 12. Solvent source 26 can, for example, contain solvents such as alcohols, esters, ketones, aliphatic petroleum naphthas, and aromatic hydrocarbons. Once solvent fills the fluid space from inlet manifold 14 to outlet manifold 16, controller 40 commands inlet manifold 14 and outlet manifold 16 to shut all valves, isolating pump 12 from all fluid sources. (Step S5). In this isolated state, controller 40 then switches pump 12 to a recirculation mode for washing. (Step S6). FIG. 4 is a schematic view of spray system 10 focusing on pump 12 during this recirculation mode. FIG. 4 illustrates all of the same elements as FIGS. 2a and 2b, with only valve positions of pump 12 and inlet and outlet manifolds 14 and 16 having changed. In the depicted recirculation mode, plunger 36 reciprocates back and forth while all pump valves 102, 104, 106, and 108 are held open, and all valves of inlet and outlet manifolds 14 and 16 are held closed. This pump configurations causes reciprocation of plunger 36 to turbulently circulate solvent through pump 12, scouring away any accumulated primary fluid. Depending on the particular primary fluid material, more or fewer cycles of recirculation may be needed. In general, materials with higher viscosity or greater fouling potential will require more cleaning cycles to flush.

For some applications, multiple wash cycles may be needed to thoroughly clean pump 12 and associated fluid lines. Controller 40 can, for example, command spray system 10 through a plurality of wash cycles by repeating steps S3 through S6 until further washing is no longer necessary. (Step S7). Once a desired number of wash cycles have been completed, dirty solvent material is purged. Controller 40 commands inlet manifold 14 and outlet manifold 16 to reconnect pump 12 to solvent source 26 and waste fluid dump 31, respectively. (Step S8). Dirty solvent fluid is purged from pump 12 by actuating pump 12 in standard pumping mode with clean solvent. (Step S9).

Figure 5:
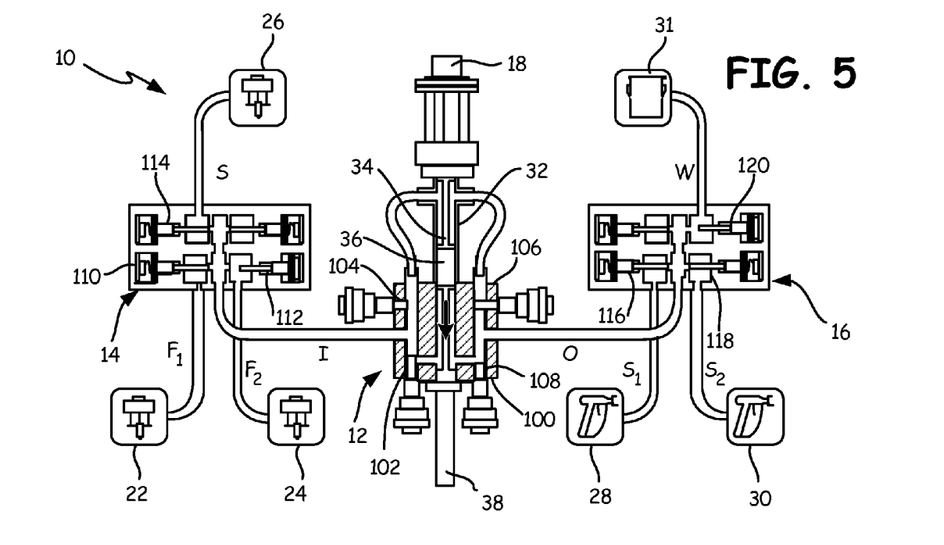
FIG. 5 is a schematic view of a purge state of the pump of FIG. 1 during a purge mode of the wash sequence of FIG. 3.

Next, solvent material is purged altogether from pump 12 via connecting pump 12 to a second primary fluid source (e.g. 24 in the depicted embodiment), and actuating pump 12 through a purge mode. Controller 40 commands inlet manifold 14 to isolate pump 12 from solvent source 26 (Step S10), and connects pump 12 to a second primary fluid source (e.g. 24; Step S11). Controller 40 then controls motorized actuator 18 and pump 12 through several cycles of ordinary pumping in a purge mode. (Step S12). FIG. 5 is a schematic view of spray system 10 during this purge mode. FIG. 5 illustrates all the same elements as FIGS. 2a, 2b, and 4, with only the valve positions of pump 12 and inlet and outlet manifolds 14 and 16 having changed. In particular, inlet manifold 14 connects pump 12 to a second primary fluid source, while outlet manifold 16 connects pump 12 to waste fluid dump 31. Valves of pump 12 are actuated synchronously with the reciprocation of plunger 36, as described above with respect to FIGS. 2a and 2b. This purge mode serves to expel solvent from pump 12 into waste fluid dump 31. Once the last of this solvent has been pumped past outlet manifold 16, controller 40 commands outlet manifold 16 to connect pump 12 to a sprayer (e.g. sprayer 28 or 30, in the depicted embodiment). (Step S13). From this point, spray operation can resume as normal, pumping the new primary fluid. (Step S14). As noted above with respect to FIG. 3, some embodiments of spray system 10 may utilize separate sprayers for each primary fluid, while others may use the same sprayer for multiple fluids, cleaning the sprayer between uses with different primary fluids.

Although method 200 has been described as a method for washing pump 12 and attached fluid lines when switching from one pumped material to another, method 200 can also be adapted as a cleaning method wherein the same primary fluid is pumped both before and after cleaning. In this application, method 200 is useful as a means of removing any material buildup within pump 12 that might give rise to clogging or congestion.

As used in material changes, method 200 allows pump 12 to be efficiently and thoroughly washed when switching between applied fluid materials, without the need for time consuming disconnection, reconnection, or manual washing of fluid handling components. Method 200 thoroughly purges pump 12 of a first material before loading and pumping a second material, while consuming only limited washing solvent.

Discussion of Possible Embodiments

The following are non-exclusive descriptions of possible embodiments of the present invention.

A fluid change method for a multi-fluid spray system having a plurality of primary fluid sources with an output line and a common pump, the method comprising: halting pumping of a first fluid from a first primary fluid source through the output line; isolating the common pump from the output line and the primary fluid sources; connecting an inlet of the common pump to a solvent source, and an outlet of the common pump to a waste fluid dump; actuating the common pump in a pumping mode to flush the first fluid from the common pump, and fill the common pump with washing solvent from the solvent source; actuating the common pump in a recirculation mode to circulate the washing solvent through the common pump; actuating the common pump in a flush mode to flush dirty solvent from the common pump; connecting an inlet of the common pump to a second primary fluid source, and actuating the pump in the pumping mode; connecting an outlet of the common pump to the output line; and starting pumping of a second fluid from the second primary fluid source through the output line.

The method of the preceding paragraph can optionally include, additionally and/or alternatively, any one or more of the following features, configurations and/or additional components:

A further embodiment of the foregoing method, wherein the common pump is a double-action linear pump with a reciprocating plunger and "up" and "down" inlet and outlet valves.

A further embodiment of the foregoing method, wherein actuating the common pump in a pumping mode comprises alternatingly executing a down-stroke of the reciprocating plunger with the "down" inlet and outlet valves open and the "up" inlet and outlet valves closed, and an up-stroke of the reciprocating plunger with the "up" inlet and outlet valves open and the "down" inlet and outlet valves closed.

A further embodiment of the foregoing method, wherein actuating the common pump in a recirculation mode comprises alternatingly executing down- and up-strokes of the reciprocating plunger with all of the inlet and outlet valves open.

A further embodiment of the foregoing method, isolating the common pump from the output line and the primary fluid sources comprises closing valves connecting the output line and the solvent source.

A further embodiment of the foregoing method, wherein a valved inlet manifold selectively couples the inlet of the common to pump the first and second fluid sources and the solvent source, individually.

A further embodiment of the foregoing method, wherein connecting an outlet of the common pump to a waste fluid dump comprises closing valves connecting the common pump to the output line and opening valves connecting the common pump the waste fluid dump.

A further embodiment of the foregoing method, wherein a valved outlet manifold selectively couples the outlet of the common pump to the outlet line and the waste fluid dump, individually.

A further embodiment of the foregoing method, wherein the washing solvent is an alcohol, ester, ketone, aliphatic petroleum naphtha, or aromatic hydrocarbon.

A spray system comprising: a first fluid source and a first sprayer for a first spray fluid; a second fluid source and a second sprayer for a second spray fluid; a solvent source for a washing solvent; a waste fluid dump; a pump comprising: a metered double-action pumping cylinder with a reciprocating plunger; first and second inlet valves; and first and second outlet valves; a valved inlet manifold configured to selectively couple the pump to the first and second fluid sources and the solvent source; a valved outlet manifold configured to selectively couple the pump to the first and second sprayers and the waste fluid dump; and a controller configured to control the pump to spray the first fluid during a first operational state and the second fluid in a second operational state, and to transition from the first operational state to the second operational state via an intermediate washing process wherein the valved inlet manifold connects the pump to the solvent source, the valved outlet manifold connects the pump to the waste fluid dump, and the pump is actuated first in a pumping mode to flush the first fluid from the pump, then in a recirculation mode to circulate washing solvent through the pump.

The spray system of the preceding paragraph can optionally include, additionally and/or alternatively, any one or more of the following features, configurations and/or additional components:

A further embodiment of the foregoing spray system, wherein the first operational state comprises the valved inlet manifold connecting the pump to the first fluid source, the valved outlet manifold connecting the pump to the first sprayer, and the pump actuating in the pumping mode to pump the first fluid through the sprayer.

A further embodiment of the foregoing spray system, wherein actuating the common pump in a pumping mode comprises alternatingly executing a down-stroke of the reciprocating plunger with the first inlet and outlet valves open and the second inlet and outlet valves closed, and an up-stroke of the reciprocating plunger with the second inlet and outlet valves open and the first inlet and outlet valves closed.

A further embodiment of the foregoing spray system, wherein actuating the common pump in a recirculation mode comprises alternatingly executing down- and up-strokes of the reciprocating plunger with all of the inlet and outlet valves open.

A further embodiment of the foregoing spray system, wherein the solvent is an alcohol, ester, ketone, aliphatic petroleum naphtha, or aromatic hydrocarbon.

A further embodiment of the foregoing spray system, wherein valving of the pump, the valved inlet manifold, and the valved outlet manifold are all controlled by the controller.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid change method for a multi-fluid spray system having a plurality of primary fluid sources with an output line and a common pump that is a double-action linear pump with a reciprocating plunger and up and down inlet and outlet valves, the method comprising:
- halting pumping of a first fluid from a first primary fluid source through the output line;
- isolating the common pump from the output line and the primary fluid sources;
- connecting an inlet of the common pump to a solvent source, and an outlet of the common pump to a waste fluid dump;
- actuating the common pump in a pumping mode to flush the first fluid from the common pump, and fill the common pump with washing solvent from the solvent source;
- actuating the common pump in a recirculation mode by alternatingly executing down- and up-strokes of the reciprocating plunger with all of the inlet and outlet valves open to turbulently circulate the washing solvent within the common pump;
- actuating the common pump in a flush mode to flush dirty solvent from the common pump;
- connecting an inlet of the common pump to a second primary fluid source, and actuating the pump in the pumping mode;
- connecting an outlet of the common pump to the output line; and
- starting pumping of a second fluid from the second primary fluid source through the output line.

2. The method of claim 1, wherein actuating the common pump in a pumping mode comprises alternatingly executing a down-stroke of the reciprocating plunger with the down inlet and outlet valves open and the up inlet and outlet valves closed, and an up-stroke of the reciprocating plunger with the up inlet and outlet valves open and the down inlet and outlet valves closed.

3. The method of claim 1, wherein isolating the common pump from the output line and the primary fluid sources comprises closing valves connecting the output line and the solvent source.

4. The method of claim 3, wherein a valved inlet manifold selectively couples the inlet of the common pump to the first and the second fluid sources and the solvent source, individually.

5. The method of claim 1, wherein connecting an outlet of the common pump to a waste fluid dump comprises closing valves connecting the common pump to the output line and opening valves connecting the common pump the waste fluid dump.

6. The method of claim 5, wherein a valved outlet manifold selectively couples the outlet of the common pump to the outlet line and the waste fluid dump, individually.

7. The method of claim 1, wherein the washing solvent is an alcohol, ester, ketone, aliphatic petroleum naphtha, or aromatic hydrocarbon.

8. A spray system comprising:
- a first fluid source and a first sprayer for spraying a first spray fluid;
- a second fluid source and a second sprayer for spraying a second spray fluid;
- a solvent source for providing a washing solvent;
- a waste fluid dump;
- a pump comprising:
  - a metered double-action pumping cylinder with a reciprocating plunger;
  - first and second inlet valves; and
  - first and second outlet valves;
- a valved inlet manifold configured to selectively couple the pump to the first and second fluid sources and the solvent source;
- a valved outlet manifold configured to selectively couple the pump to the first and second sprayers and the waste fluid dump; and
- a controller configured to control the pump to spray the first fluid during a first operational state and the second fluid in a second operational state; and to transition from the first operational state to the second operational state via an intermediate washing process wherein during the intermediate washing process the valved inlet manifold connects the pump to the solvent source, the valved outlet manifold connects the pump to the waste fluid dump, and the pump is actuated first in a pumping mode to flush the first fluid from the pump, then in a recirculation mode that alternatingly executes down- and up-strokes of the reciprocating plunger with the first and second inlet valves and the first and second outlet valves open to turbulently circulate the washing solvent within the pump, and then a purge mode to flush waste solvent from the pump.

9. The spray system of claim 8, wherein the first operational state comprises:
- the valved inlet manifold connecting the pump to the first fluid source;
- the valved outlet manifold connecting the pump to the first sprayer; and
- the pump actuating in the pumping mode to pump the first fluid through the sprayer.

10. The spray system of claim 8, wherein actuating the common pump in a pumping mode comprises:
- alternatingly executing a down-stroke of the reciprocating plunger with the first inlet and outlet valves open and the second inlet and outlet valves closed and an up-stroke of the reciprocating plunger with the second inlet and outlet valves open and the first inlet and outlet valves closed.

11. The spray system of claim 8, wherein the solvent is an alcohol, ester, ketone, aliphatic petroleum naphtha, or aromatic hydrocarbon.

12. The spray system of claim 8, wherein valving of the pump, the valved inlet manifold, and the valved outlet manifold are all controlled by the controller.

* * * * *

UNITED STATES PATENT AND TRADEMARK OFFICE
CERTIFICATE OF CORRECTION

PATENT NO.         : 9,901,945 B2
APPLICATION NO.    : 14/904655
DATED              : February 27, 2018
INVENTOR(S)        : David L. Fehr and Dennis J. Van Keulen It is certified that error appears in the above-identified patent and that said Letters Patent is hereby corrected as shown below:

On the Title Page

Abstract, Line 11:
Delete "pumping mode pumping"
Insert --pumping--

Signed and Sealed this
First Day of May, 2018

Andrei Iancu
*Director of the United States Patent and Trademark Office*